March 19, 1963   A. F. OATLEY   3,081,806
MINCING MACHINE
Filed Aug. 18, 1960
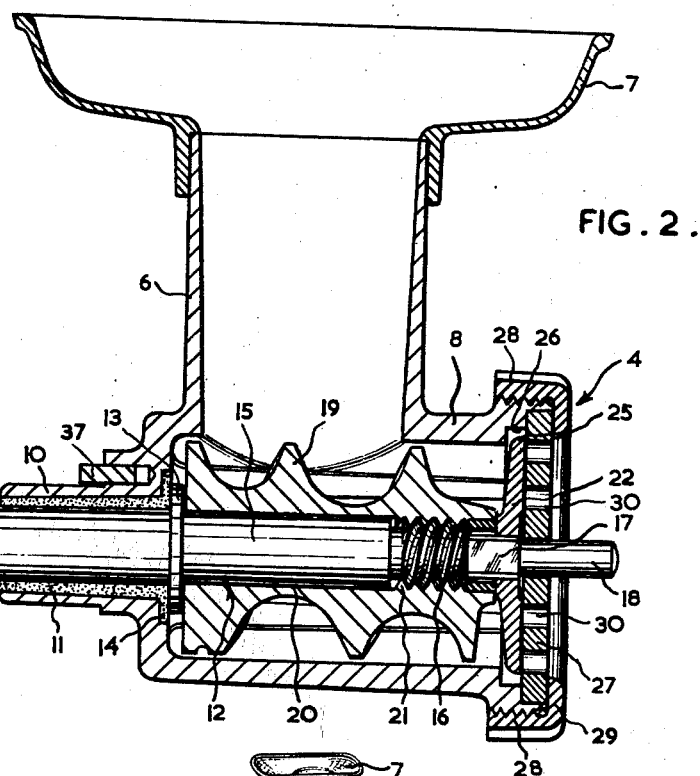
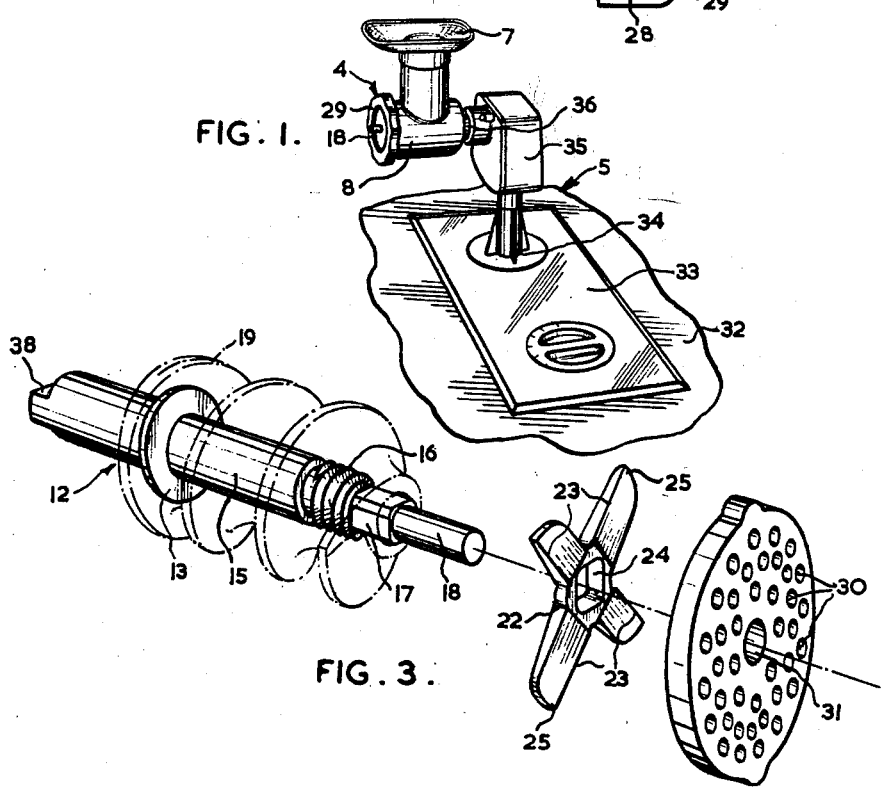

United States Patent Office 3,081,806
Patented Mar. 19, 1963

3,081,806
MINCING MACHINE
Arthur Frederick Oatley, Wilton Lodge, Wergs Road,
Tettenhall, Wolverhampton, England
Filed Aug. 18, 1960, Ser. No. 50,468
7 Claims. (Cl. 146—189)

This invention relates to mincing machines of the kind comprising a rotatable feed screw, usually having a substantially horizontal axis, for feeding material to be minced from a hopper to a bladed cutter rotatable with the feed screw, the blade or blades of the cutter co-operating with a fixed perforate plate. This invention is particularly applicable to power-driven food mincing machines for domestic use.

Difficulty has been encountered with mincing machines of this kind in maintaining the cutter blade or blades in tight contact with the perforate plate, it being essential that such tight contact is maintained so as to ensure a satisfactory action and to avoid food or other material becoming jammed between the cutter and plate. The object of this invention is to overcome or reduce this difficulty.

According to the present invention there is provided a mincing machine of the kind specified in which the cutter and feed screw are mounted on a common driving shaft, the cutter being positively driven by the shaft but free to move along it axially, and the feed screw being connected to the shaft by helical formations, such as co-operating screw-threads, of the same hand as the feed screw, the arrangement being such that an increase in resistance to rotation of the feed screw causes this screw to urge the cutter into tighter engagement with the fixed perforate plate. Preferably the driving shaft extends through a hole in the hopper at that end thereof remote from the cutter, and a thrust bearing is provided to counteract the axial reaction on the shaft and also to form a seal against the entry of oil or other foreign matter into the hopper through this hole.

An embodiment of the invention will now be described by way of example with reference to and as illustrated by the accompanying drawings in which:

FIGURE 1 is a perspective view of a mincing machine according to the present invention.

FIGURE 2 is an enlarged vertical central cross-sectional view of the mincing machine.

FIGURE 3 is an exploded perspective view of part of the mincing machine.

The mincing machine 4 shown in the drawings is of the kind particularly useful for domestic use and is in the form of an attachment for a power-operated driving means 5, as shown in FIGURE 1. The mincing machine has a hopper 6 in the form of a vertical metal tube open at both its upper and lower ends. The upper end of the hopper 6 has fitted round it a tray 7 to guide food into the hopper, and the lower end of the hopper communicates with the interior of a housing 8 in the form of a horizontal tube integral with the hopper 6, the hopper being towards one end of the housing 8, or towards the left end thereof as illustrated in FIGURE 2. This end of the housing has a central hole 9 surrounded on its outer face, FIGURE 2, by a tubular spigot 10 housing a bearing sleeve 11 for a driving shaft 12 which extends axially through the housing.

Immediately inside the housing 8 adjacent to the bearing 11 the driving shaft 12 has an integral radially projecting collar 13 which engages a bearing ring 14 provided by an external annular flange formed integral with the inner end of the bearing 11. The collar 13 and bearing ring 14 are provided to counteract the axial reaction on the driving shaft 12 and also to form a seal against the entry of oil or other foreign matter into the hopper through the hole 9.

Within the housing the driving shaft 12 is machined with a series of formations which are, taken in order from the collar 13, as shown more clearly in FIGURE 3, a cylindrical portion 15 extending beneath the hopper, a left-hand three start thread 16 of maximum diameter equal to that of the cylindrical portion 15, a square-section spigot 17 of smaller maximum dimensions and a terminal spigot 18 of still smaller diameter. A feed screw 19 of the mincing machine has an axial bore 20, FIGURE 2, to receive the driving shaft 12 and this is internally screw threaded 21 adjacent to one end for co-operation with the three start thread 16 on the shaft. The feed screw 19 overlaps one end of the square-section spigot 17 and the remainder of this spigot carries a cutter 22 which takes the form of a cross-shaped plate with each arm sharpened on one side to form a blade 23, the plate having a square central hole 24 for engagement with the square-section spigot 17. The tips 25 of the blades 23 enter an annular groove 26 in the wall of the housing 8 and the cutter bears against the inner face of a fixed, hardened perforate plate 27 of larger diameter inset in the otherwise open end of the housing and releasably secured in place by an inwardly directed flange 28 on a ring 29 in screw threaded engagement with the exterior of the housing. The perforate plate 27 is formed with a ring or rings of holes 30, as shown in FIGURE 3, the edges of which co-operate with the cutter blades 23 to mince the food. A central hole 31 in the perforate plate 27 acts as a bearing for the terminal spigot 18 on the driving shaft.

The power-operated driving means 5 on which the mincing machine is detachably fitted comprises, as shown in FIGURE 1, a fixed driving unit, driven by an electric motor and which is normally secured to a base unit such as a counter, bench or table below the working surface 32 and having in its top surface 33, which lies on a level with the working surface 32, an upwardly directed torque-outlet 34. A reduction gear box 35 adapted to be detachably secured at its base to the top surface 33 of the power unit has a drive input coupling, not shown, adapted to engage separably the upwardly directed torque outlet, the drive input being connected through gearing to a drive outlet in the side and near the top of the gear box.

The mincing machine is fitted to the gear box 35 by inserting the tubular spigot 10 into an output socket 36 in which it is held by suitable retaining means. A locating pin 37 provided in the housing 8 engages a complementary recess in the output socket 36 and prevents angular movement of the mincing machine whilst it is mounted on the driving means. A dog-clutch element 38, formed at the end of the driving shaft which projects through the outer end of the bearing sleeve 11, to engage a complementary dog-clutch element, not shown, in the drive outlet when the mincing machine is fitted in position on the gear-box.

From the foregoing description it will be appreciated that in use when the driving shaft is rotated counterclockwise, as viewed from the cutter end, any resistance to rotation of the feed screw 19 tends to cause the feed screw to move along the driving shaft towards the cutter, the engagement between the end of the feed screw, or a bearing washer inserted in this end of the feed screw, and the cutter urging the cutter into tight engagement with the perforate plate 27. This ensures satisfactory cutting and automatically compensates for cutter wear. At the same time the reaction on the driving shaft in a direction away from the cutter brings the collar 13 on the shaft into sealing engagement with the bearing ring 14 inset in the inner face of the wall of the housing at the other end.

I claim:

1. In a mincing machine of the type having a rotatable feed screw for feeding material to be minced from a hopper to a bladed cutter rotatable with the feed screw and cooperative with a fixed perforated plate, wherein the cutter of the feed screw is mounted on a common drive shaft, the cutter being positively driven by the shaft but free to move axially thereof, the improvement comprising a connection of the feed screw to the shaft, said connection including cooperating, freely engaging screw threads of the same hand as the feed screw, whereby an increase in resistance to rotation of the feed screw causes said screw to urge the cutter into tighter engagement with the fixed perforated plate.

2. A mincing machine according to claim 1 wherein coupling means connect the driving shaft to power means for rotation.

3. The combination of a mincing machine according to claim 1, a firmly supported power operated driving unit, and a gear-box by which the mincing machine is detachably supported on the driving unit and through which it is driven with velocity reduction.

4. The combination according to claim 3 in which the driving unit is adapted to be secured to a horizontal surface and has an upwardly directed torque outlet the rotational axis of which is vertical; the gearbox is detachably mounted on the driving unit over the torque outlet and has an input coupling which, when the gearbox is mounted on the driving unit, drivably engages the torque outlet and an output socket with a rotatable axis lying in a plane at right angles to the plane containing the axis of the input coupling; and the mincing machine is detachably mounted on the gearbox at the output socket so that the mincing machine is spaced from and above the horizontal surface.

5. A mincing machine comprising in combination a body having a hopper and a feed chamber open to the hopper, a driving shaft rotatable about a horizontal axis and passing through the feed chamber, a feed screw mounted on the driving shaft, interengaging relatively rotatable helical formations on the feed screw and driving shaft and of the same hand as the feed screw, a perforate plate secured to the body co-axial with the drive shaft and occupying an opening from the feed chamber, and a bladed cutter positively driven by the shaft but free to move along it axially and disposed co-axially between the feed screw and the perforate plate.

6. A mincing machine according to claim 5 and further comprising power-operated driving means and coupling means for drivably connecting the driving means to the driving shaft.

7. A meat chopper comprising a body having a hopper and a feed chamber open to the hopper and having an open outlet, a drive shaft rotatably mounted in the body and having within the feed chamber an externally screw-threaded portion and close to the outlet a non-circular portion, a feed screw thread complementary to and freely engaging the screw-threaded portion of the drive shaft, a perforate plate having a cutting face and non-rotatably but detachably mounted in the open outlet, and a bladed cutter slidably but non-rotatably mounted on said non-circular portion, axially movable thereon towards said perforate plate by the feed screw and having radial cutting edges which engage said cutting face.

References Cited in the file of this patent

UNITED STATES PATENTS

| | | |
|---|---|---|
| Re. 21,817 | Gronnich | June 3, 1941 |
| 303,482 | Baker | Aug. 12, 1884 |
| 545,785 | Ellrich | Sept. 3, 1895 |

FOREIGN PATENTS

| | | |
|---|---|---|
| 440,697 | France | Mar. 9, 1912 |
| 240,056 | Great Britain | Sept. 24, 1925 |
| 986,296 | France | Mar. 21, 1951 |